United States Patent
Davis

(10) Patent No.: US 10,907,700 B2
(45) Date of Patent: Feb. 2, 2021

(54) TORQUE IMPACT MITIGATOR FOR POWER TONG

(71) Applicant: Truman R. Davis, Abilene, TX (US)

(72) Inventor: Truman R. Davis, Abilene, TX (US)

( * ) Notice: Subject to any disclaimer, the term of this patent is extended or adjusted under 35 U.S.C. 154(b) by 0 days.

(21) Appl. No.: 16/781,520

(22) Filed: Feb. 4, 2020

(65) Prior Publication Data

US 2020/0173518 A1    Jun. 4, 2020

Related U.S. Application Data

(63) Continuation-in-part of application No. 16/208,760, filed on Dec. 4, 2018, now Pat. No. 10,597,955, and a continuation-in-part of application No. 16/289,774, filed on Mar. 1, 2019, now Pat. No. 10,724,597.

(51) Int. Cl.
| | |
|---|---|
| *E21B 19/16* | (2006.01) |
| *F16F 9/19* | (2006.01) |
| *F16F 9/34* | (2006.01) |
| *F16F 9/512* | (2006.01) |
| *F16F 13/00* | (2006.01) |

(52) U.S. Cl.
CPC .............. *F16F 13/007* (2013.01); *F16F 9/19* (2013.01); *F16F 9/3405* (2013.01); *F16F 9/5126* (2013.01); *F16F 2232/08* (2013.01); *F16F 2234/02* (2013.01); *F16F 2236/045* (2013.01); *F16F 2238/026* (2013.01)

(58) Field of Classification Search
CPC ........ E21B 19/161; E21B 19/166; F16F 9/19; F16F 9/3405; F16F 9/5126; F16F 13/007
See application file for complete search history.

(56) References Cited

U.S. PATENT DOCUMENTS

| | | | | |
|---|---|---|---|---|
| 1,836,184 | A | * | 12/1931 | Nixon .................... E21B 19/161 |
| | | | | 137/596.2 |
| 2,311,225 | A | * | 2/1943 | Grable .................. E21B 19/161 |
| | | | | 81/57.16 |
| 3,072,954 | A | * | 1/1963 | Patriquin .................. E05F 3/02 |
| | | | | 16/66 |

(Continued)

FOREIGN PATENT DOCUMENTS

| | | | | |
|---|---|---|---|---|
| DE | 102014105025 A1 | * | 10/2015 | ............ F16F 13/007 |
| DE | 102014105025 B4 | | 5/2018 | |
| GB | 455841 A | * | 10/1936 | ................ F16F 9/19 |

*Primary Examiner* — Matthew R Buck
(74) *Attorney, Agent, or Firm* — Daniel M. Cohn; Howard M. Cohn

(57) ABSTRACT

According to the present invention, there is disclosed a torque impact mitigator including a hydraulic cylinder having a compression end and a rebound end. A piston rod mounted to the piston and extends out from the hydraulic cylinder through the first end cap. A compression spring is compressed when the piston rod is moved out of the hydraulic cylinder and in a relaxed state when the piston rod is moved towards a second end cap. Bores through the piston allow the passage of hydraulic fluid from the rebound end to the compression end of the cylinder. A relief valve is secured to the piston within the rebound end to momentarily reduce the pressure of the hydraulic fluid caused by an instantaneous hydraulic pressure increase due to the initial movement of the piston from the rebound end to the compression end.

20 Claims, 12 Drawing Sheets

(56) References Cited

U.S. PATENT DOCUMENTS

| | | | | |
|---|---|---|---|---|
| 4,973,077 | A * | 11/1990 | Kuwayama | B60G 21/0553 |
| | | | | 188/318 |
| 5,738,191 | A * | 4/1998 | Forster | F16F 9/466 |
| | | | | 188/315 |
| 7,191,686 | B1 * | 3/2007 | Angelle | E21B 19/163 |
| | | | | 81/57.34 |
| 9,481,221 | B2 * | 11/2016 | Reybrouck | F16F 9/46 |
| 2004/0251097 | A1 * | 12/2004 | Barbison | F16F 9/34 |
| | | | | 188/315 |
| 2011/0056783 | A1 * | 3/2011 | Teraoka | F16F 9/5126 |
| | | | | 188/313 |
| 2014/0352972 | A1 * | 12/2014 | Gutierrez | E21B 29/12 |
| | | | | 166/335 |
| 2016/0230830 | A1 * | 8/2016 | Haller | F16F 9/185 |
| 2017/0284495 | A1 * | 10/2017 | Matsumoto | F16F 9/3257 |
| 2018/0058161 | A1 * | 3/2018 | Stoldt | E21B 19/161 |
| 2019/0226545 | A1 * | 7/2019 | Schmidt | F16F 9/067 |

\* cited by examiner

TORQUE IMPACT MITIGATOR FOR POWER TONG

CROSS-REFERENCE TO RELATED APPLICATIONS

The present application is a Continuation-In-Part Application of U.S. application Ser. No. 16/208,760 filed Dec. 4, 2018 and U.S. application Ser. No. 16/289,774 filed Mar. 1, 2019.

BACKGROUND OF INVENTION

In the drilling and completion phases in exploring for oil and gas, pipe tongs have been utilized for engaging lengths of casing, drill or completion pipe, known generally as tubular members, end to end, by rig floor personnel operating power tongs directly and in close proximity to the tubulars on the rig floor. A typical casing power tong comprises a set of jaws to make up or break up the joint. The power tongs may weigh a few thousand pounds and are usually supported from the rig by a cable that allows the power tong to be moved manually by the rig floor personnel to engage the pipe, or disengage from the pipe, and be positioned away from the pipe string, to allow other work to proceed. The power tong is connected on the one end to the rig cable.

However, because of the size of the power tongs, more than a single individual, often times two or three men, are required to move the tong into position, and operate the tong to make up or break the joint, and then to manually swing the tong, hanging from the cable, out of the way, and engage it in a position away from the pipe, so that the rig personnel can proceed to other chores. This manual operation of the tong in and out of position must be done with care, since the tong, swinging free from the cable, may strike one of the workers, or inadvertently disengage from its position and injure workers or damage materials on the rig floor.

SUMMARY OF THE INVENTION

According to the present invention, there is disclosed a torque impact mitigator. The torque impact mitigator comprises a housing assembly including a hydraulic cylinder having a compression end and a rebound end. The housing assembly includes a first end cap secured to the compression end of the hydraulic cylinder and a second end cap mounted to rebound end of the hydraulic cylinder. A piston is disposed within the hydraulic cylinder and is adapted to reciprocate back and forth within the hydraulic cylinder. A piston rod is disposed within the hydraulic cylinder and is mounted at a first end to the piston and has a second end extending out from the hydraulic cylinder through a bore through the first end cap. A compression spring is disposed between the piston and the first end cap to compress the compression spring into a compressed state when the piston rod is moved out of the hydraulic cylinder through the bore and to release the compression spring into a relaxed state when the piston rod is moved towards the second end cap. One or more bores are disposed through the piston to allow the passage of hydraulic fluid from the rebound end into the compression end of the hydraulic cylinder when the compression spring is released into the relaxed state when the piston is moved from the compression end of the hydraulic cylinder to the rebound end, and to allow the passage of hydraulic fluid from the compression end into the rebound end of the hydraulic cylinder when the compression spring moves from the relaxed state to the compressed state. A relief valve is secured to the piston within the rebound end of the hydraulic cylinder to momentarily reduce the pressure of the hydraulic fluid caused by an instantaneous hydraulic pressure increase due to the initial movement of the piston from the rebound end to the compression end of the hydraulic cylinder.

Further, according to the present invention, there is disclosed a torque impact mitigator, comprising a housing assembly including a hydraulic cylinder having a compression end and a rebound end. A piston disposed within the hydraulic cylinder. A piston rod mounted at a first end to the piston and having a second end extending out from the hydraulic cylinder. A compression spring is disposed against the piston to be compressed into a compressed state when the piston rod is moved out of the hydraulic cylinder and to be released into a relaxed state when the piston rod is moved into the hydraulic cylinder. One or more bores disposed through the piston to allow the passage of hydraulic fluid from the rebound end into the compression end when the piston is moved from the compression end to the rebound end, and to allow the passage of hydraulic fluid from the compression end into the rebound end when the piston is moved from the rebound end to the compression. A relief valve secured to the piston within the rebound end of the hydraulic cylinder to momentarily open in response to an instantaneous pressure increase of the hydraulic pressure generated by the initial movement of the piston from the rebound end to the compression end of the hydraulic cylinder.

BRIEF DESCRIPTION OF THE DRAWINGS

The structure, operation, and advantages of the present invention will become further apparent upon consideration of the following description taken in conjunction with the accompanying figures (Figures). The figures are intended to be illustrative, not limiting.

Certain elements in some of the figures may be omitted, or illustrated not-to-scale, for illustrative clarity. The cross-sectional views may be in the form of slices, or near-sighted cross-sectional views, omitting certain background lines which would otherwise be visible in a true cross-sectional view, for illustrative clarity.

Often, similar elements may be referred to by similar numbers in various figures (Figures) of the drawing, in which case typically the last two significant digits may be the same, the most significant digit being the number of the drawing figure (Figure).

FIG. 1 is a front, three-dimensional view of a torque impact mitigator in use with a power tong, according to the present invention.

FIG. 2 is a front, three-dimensional view of a torque impact mitigator, according to the present invention.

FIG. 3 is a front, three-dimensional exploded view of the torque impact mitigator, according to the present invention.

FIG. 4 is a front, three-dimensional view of a spring disposed about a piston rod mounted to a piston, according to the present invention.

FIG. 5 is a side, cross-sectional view of the torque impact mitigator in a contracted condition, according to the present invention.

FIG. 6 is a side, cross-sectional view of the torque impact mitigator in an expanded condition, according to the present invention.

FIG. 6A is a side three-dimensional view of the piston, the piston seal, and the piston ring, according to the present invention.

FIG. 7 is a front, three-dimensional view of a torque impact mitigator incorporating a damper tube including an adjustable flow control valve, according to the present invention.

FIG. 8 is a side, cross-sectional view of the torque impact mitigator of FIG. 7 incorporating a damper tube including an adjustable flow control valve in an expanded condition, according to the present invention.

FIG. 9 is a side, cross-sectional view of the torque impact mitigator incorporating a damper tube including an adjustable flow control valve in a contracted condition, according to the present invention.

FIG. 10 is a side, cross-sectional view of another embodiment of a torque impact mitigator incorporating a relief valve mounted to the piston, according to the present invention.

Figure 10:
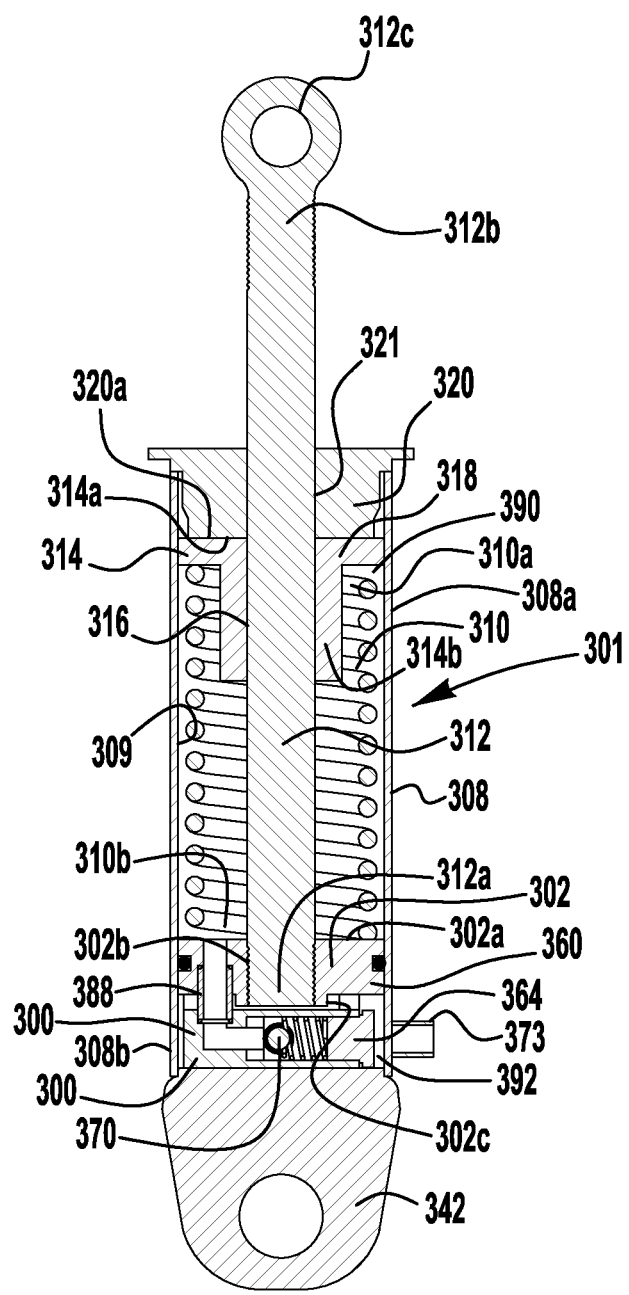
Figure 11:
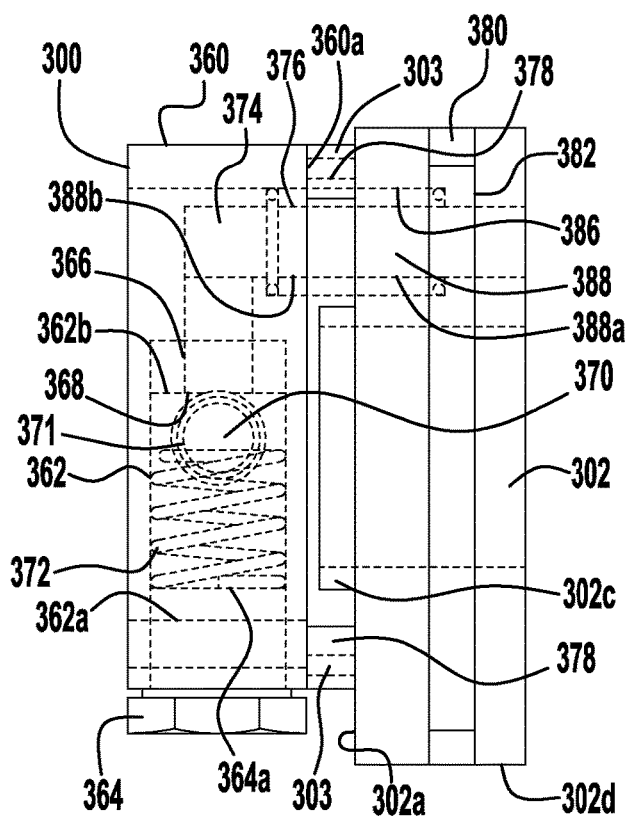

FIG. 11 is a side view of the relief valve shown in FIG. 10 mounted to the piston, according to the present invention.

Figure 12:
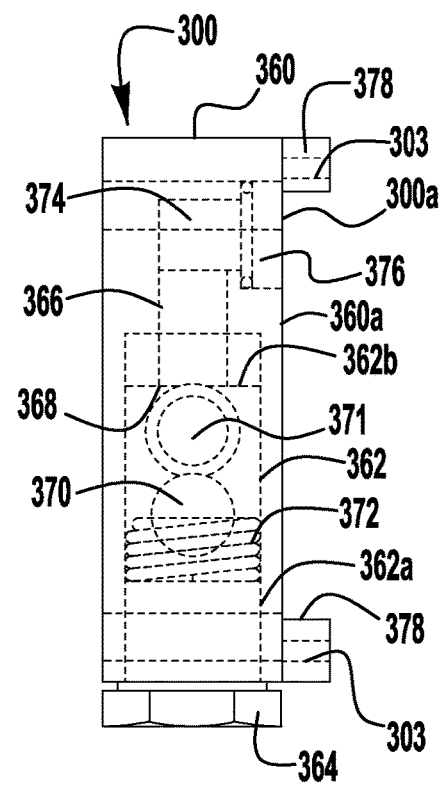

FIG. 12 is a side view of the piston shown in FIG. 11, according to the present invention.

Figure 13A:
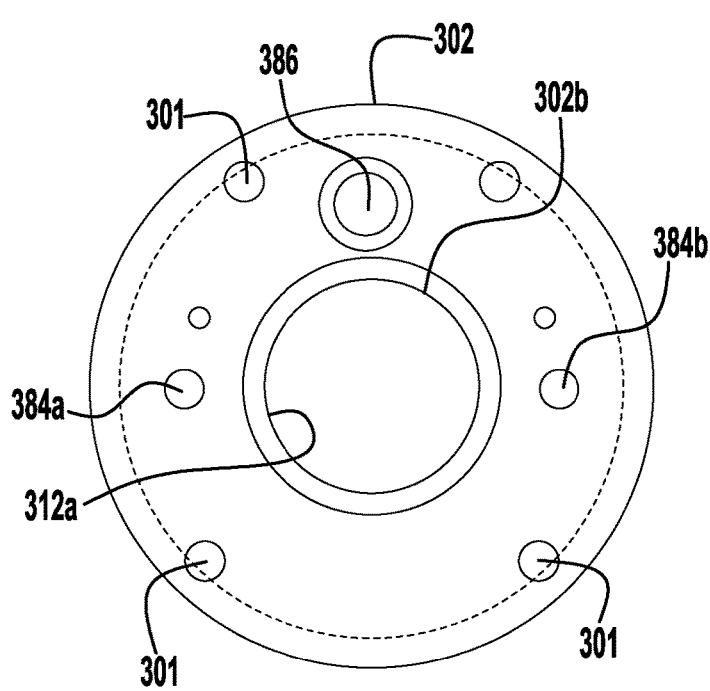

FIG. 13A is a side view of the piston shown in FIG. 11, according to the present invention.

Figure 13B:
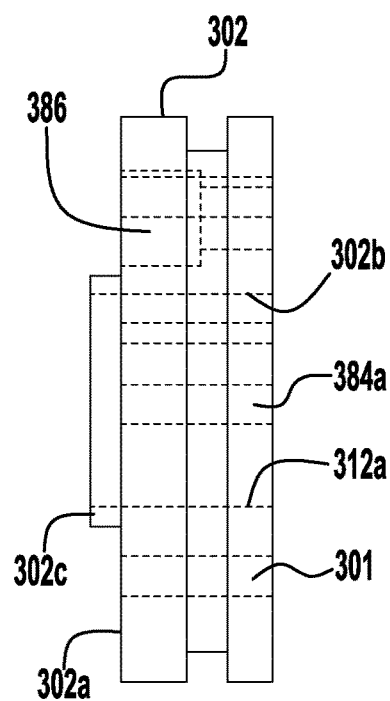

FIG. 13B is a side view of the piston shown in FIG. 11, according to the present invention.

Figure 14:
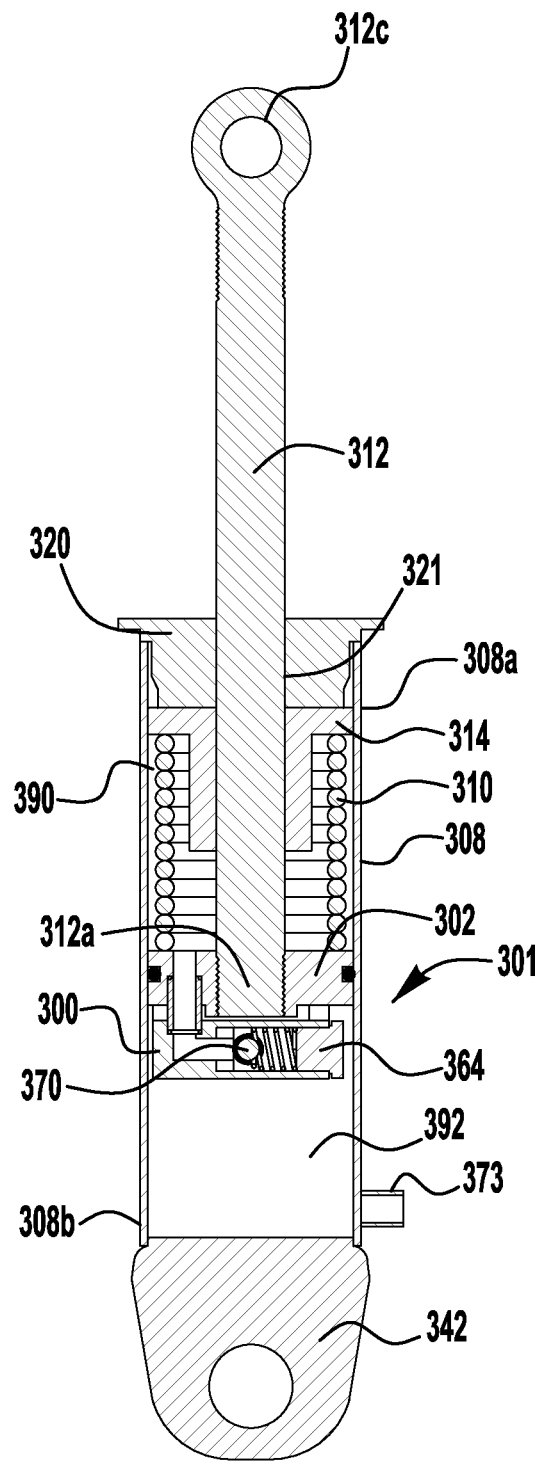

FIG. 14 is a side, cross-sectional view of another embodiment of a torque impact mitigator incorporating a relief valve mounted to the piston when the piston rod is pulled out from the hydraulic cylinder, according to the present invention.

DETAILED DESCRIPTION OF THE PREFERRED EMBODIMENT

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

In drilling a well, a drill string is used. The drill string can comprise a drill bit attached to sections of drill pipe. As the well is drilled, additional sections of drill pipe are added to the drill string to extend its length until the well is drilled deep enough to reach a formation where substances, such as water, oil or gas, can be extracted from the well. Sections of pipe are joined together using threaded connections on the pipe, often referred to as "pin" and "box", where the pin of one section of pipe is threaded into the box of an adjoining section of pipe. The drill string is rotated to turn the drill bit in a wellbore in order to drill the well. When the drill string is removed from the wellbore, the sections of pipe are typically removed from the drill string one or more sections at a time.

To make or break the threaded connection between sections of pipe, a power tong device can be used to do so. Known designs use a motor with a transmission to operate the power tong mechanism which grips and turns one section of pipe relative to an adjacent section of pipe. As one pipe rotates with respect to the adjacent section of pipe, the two sections of pipe are threaded together or unthreaded so that the two sections of pipe can be separated from each other.

When "breaking a joint" also know as unthreading the two lengths of pipe, the power tong uses shifts into a lower gear of the transmission to increase the torque applied to a first length of pipe being turned to a level required to break the joint. Then, after the joint is broken, the power tong is shifted to a higher gear of the transmission causing an increase in the rotational speed of the first length of pipe being turned to unthread the first length of pipe from the second length of pipe and thus break the connection. When a making a joint between the two lengths of pipe, the higher gear is first used to start the threaded connection by rotating a first length of pipe at a relatively high rotational speed. Then, the transmission is shifter into a lower gear to increase the torque applied to a first length of pipe being turned to a level required to make the joint so that the first and second lengths are firmly connected together.

Figure 1:
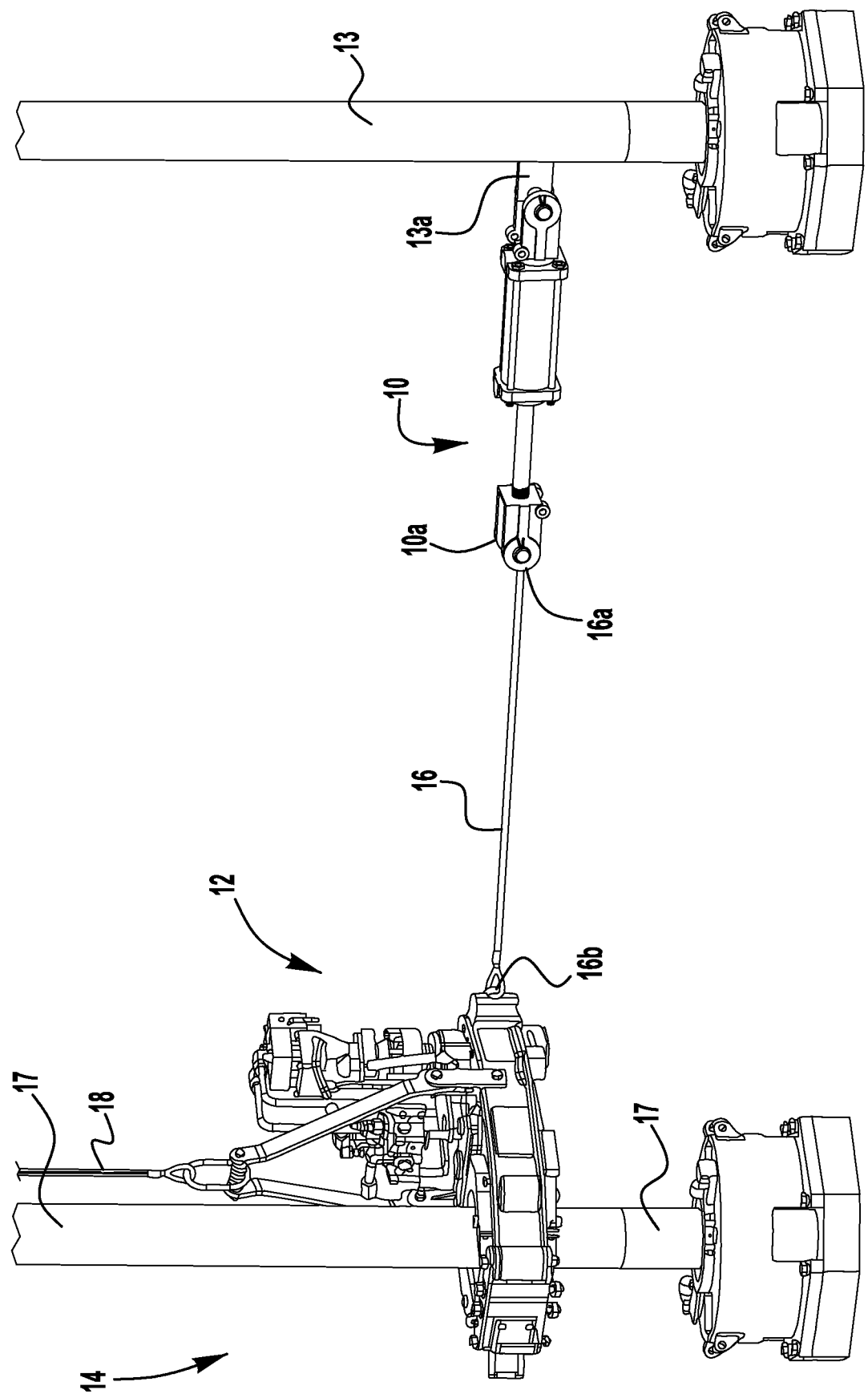

FIG. 1 illustrates a three-dimensional, front view of a torque impact mitigator 10, to be used in conjunction with a power tong 12 on an oil drilling rig 14. The torque impact mitigator 10 is anchored to the drilling rig 14. A cable 16 is connected at one end 16a to one end 10a of the torque impact mitigator 10, and on an opposite second end 16b to the power tong 12. A second end 10b of the torque impact mitigator 10 can be mounted to a support 13 of an oil well rig. The power tong 12 is typically suspended from the oil drilling rig by a cable 18. The torque impact mitigator 10 reduces rotation torque impact of the power tong 12 and holds the power tong in position with respect to the pipes or tubulars being connected to each other or disconnected from each other.

Typically, there are several types of pipe or tubulars 17 screwed together one piece to another, end to end, until the entire number of sections of pipe required for the job are joined together and run into the ground below the rig floor. Even through the pipes 16 being formed into a casing string are often formed of steel, when they are screwed together, care has to be taken, especially when the torque is increased to ensure a tight connection, to stop the rotation without the power tong tightening too much because of the inertia. When this occurs, the sleeves interconnecting the adjacent sections of pipe can be damaged.

Figure 2:
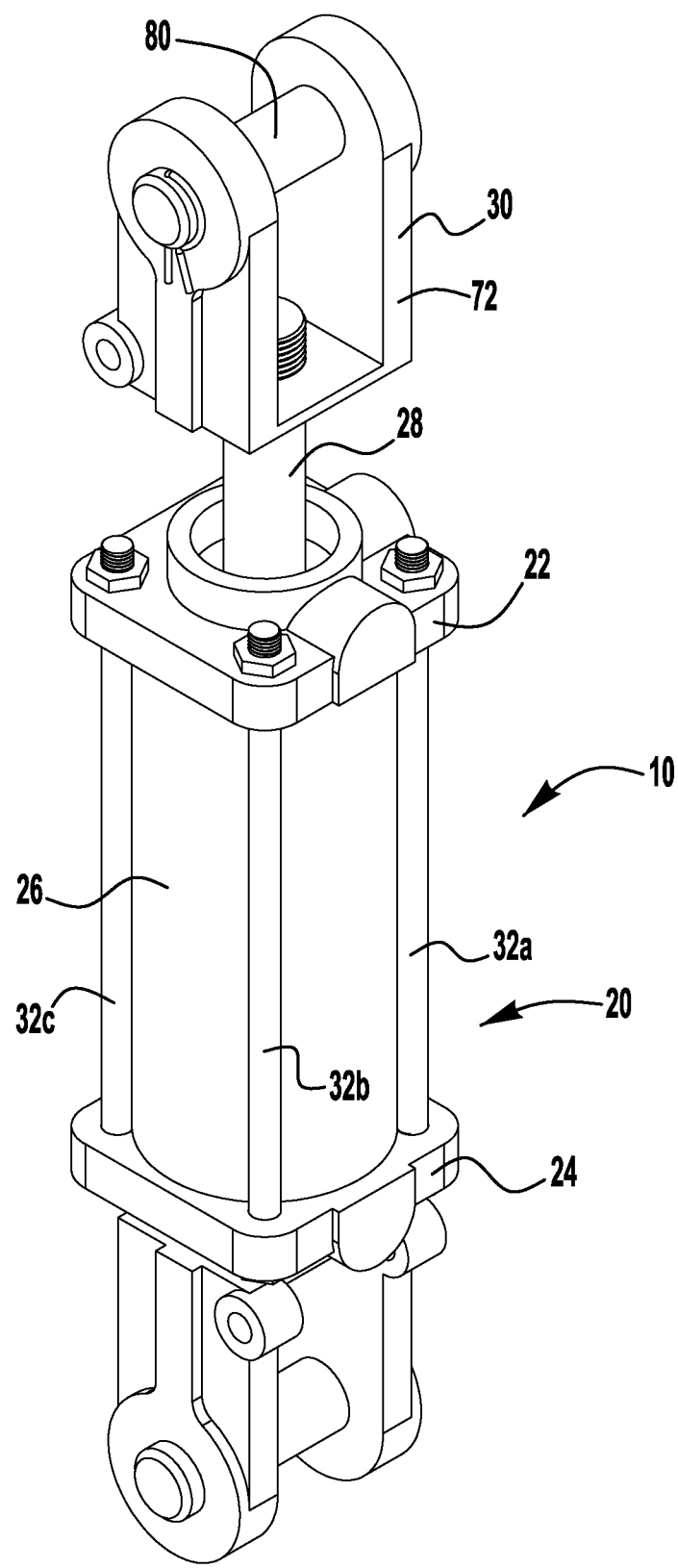

FIG. 2 is a front, three-dimensional view of the torque impact mitigator 10. The torque impact mitigator 10 includes a housing assembly 20, comprising a first end cap 22 and second end cap 24, and a hydraulic tube or hydraulic cylinder 26 that is secured between the first end cap 22 and second end cap 24. A piston rod 28 extends out from the first end cap 22 and is threaded to a rod clevis 30. The first and second end caps 22 and 24 are secured to opposite ends of the hydraulic tube or cylinder 26 by four tie rods 32a, 32b, 32c, and 32d to form housing assembly 20.

Figure 3:
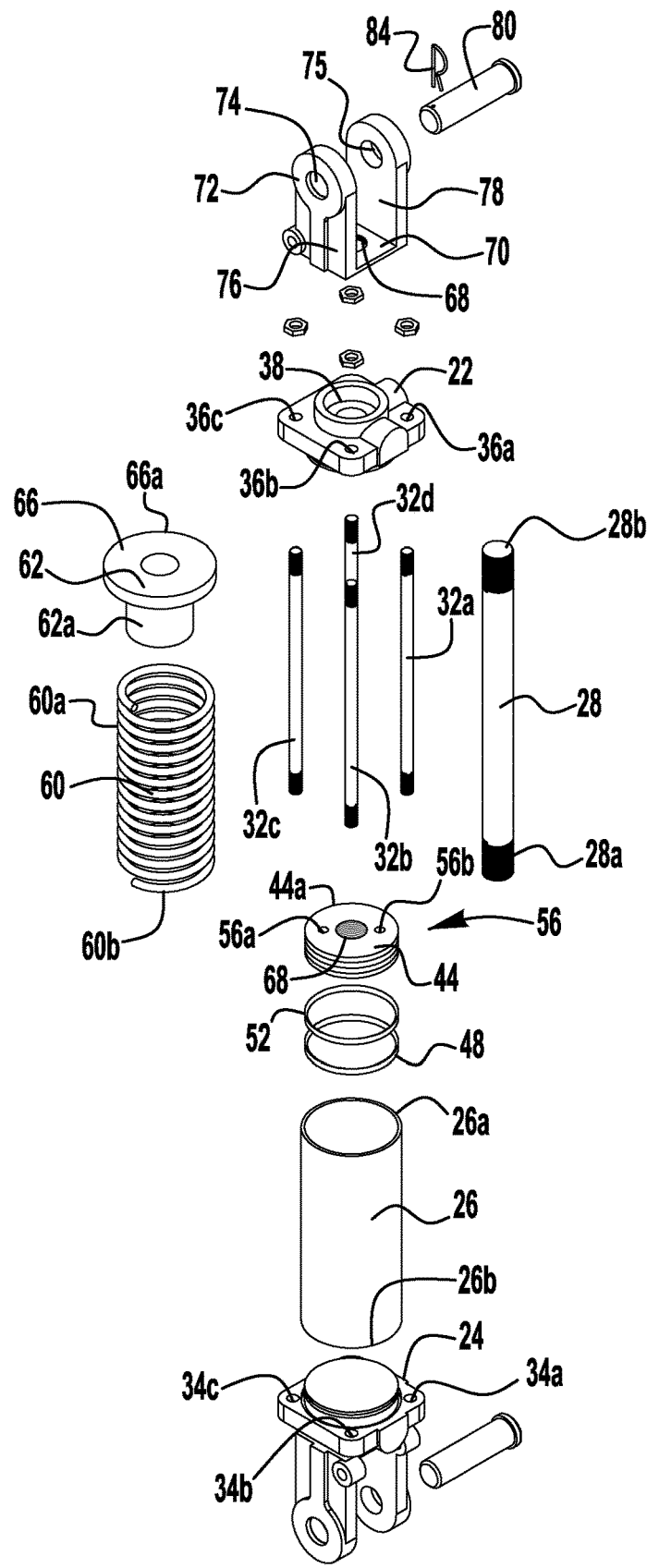

Referring to FIG. 3, each of the four tie rods 32a, 32b, 32c, and 32d extends at a first end through an opening 34a, 34b, 34c, and 34d, respectively, in the second end cap 24, and at a second opposite end through an opening 36a, 36b, 36c, and 36d, respectively, in the first end cap 22. Further, the first end cap 22 has an opening 38 through which the piston rod 28 extends. Surrounding the first opening 38 and disposed on the underside of the first end cap 22 is a first circular slot 40, see FIG. 5, that is designed to receive a first or compression end 26a of hydraulic cylinder 26. Similarly, the second end cap 24 has a second circular slot 42 disposed on the underside of the second end cap, see FIG. 5, that is designed to receive a second or rebound end 26b of hydraulic cylinder 26. It must be noted that any size or shape hydraulic cylinder may be used, depending on the application.

The torque impact mitigator 10 contains a piston 44 disposed within the hydraulic cylinder 26 so as to reciprocate back and in the cylinder. The piston 44 has one end 28a of the piston rod secured thereto, typically by a threaded connection, within a threaded opening 44a within the piston 44. As shown in FIG. 6A, a piston wear ring 48 is fitted into a first groove 50 formed in the cylindrical surface 44a of the piston 44. The piston wear ring 48 provides a side load bearing area to prevent scoring of the inner surface 27 of the hydraulic cylinder 26. A piston seal 52 is fitted into a second groove 54 formed in the cylindrical outer surface 44a of the piston 44. The piston seal 52 can be for example, an o-ring expander which provides a positive seal with minimal friction to extend the seal operation under high pressure.

The piston 44 can have a one or more bores 56 extending therethrough. While two bores 56a and 56b are illustrated, it is within the scope of the invention to use as few as one bore and as many as needed, such as for example six or eight bores.

Figure 4:
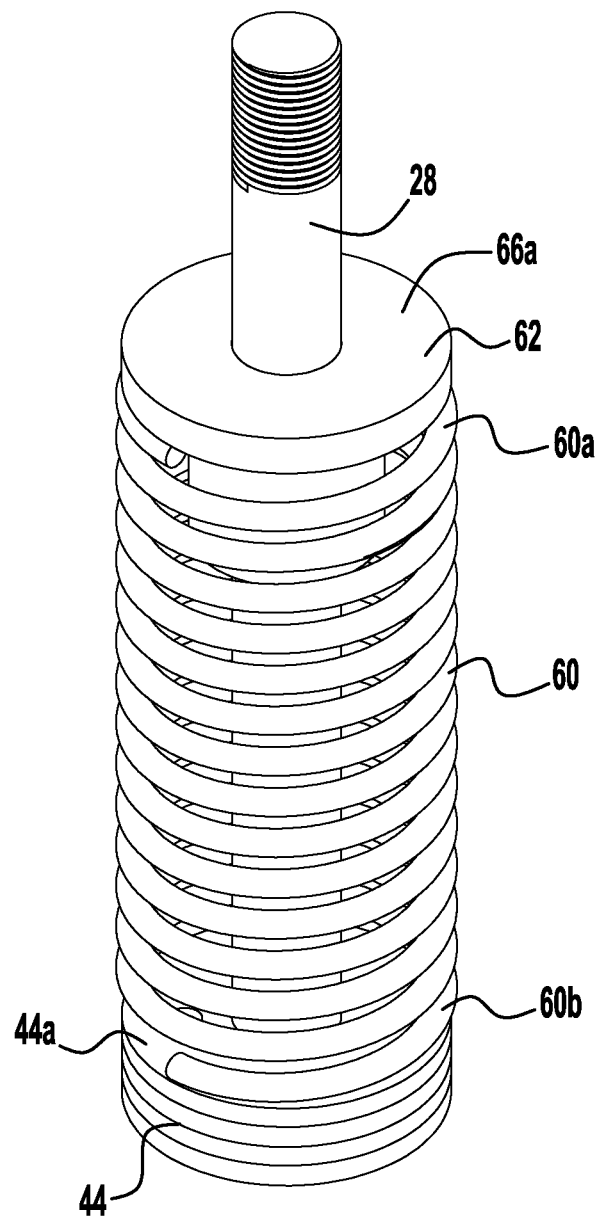

Referring to FIG. 4, a compression spring 60 is disposed about the piston rod 28 and has an outer diameter approximately equal to the inner diameter of the hydraulic cylinder 26. A plug 62 is disposed within the upper end 60a of the spring 60. The plug 62, as shown in FIG. 3, has a bore 64 extending therethrough to receive piston rod 28. The plug 62 has an outer cylindrical element 66 which has a diameter that is approximately equal to the inner diameter of the hydraulic cylinder 26. The outer surface 66a of the plug 62 rests against the inner surface 22a of the first end cap 22. The plug 62 has an inner cylindrical surface element 62a which intersects the inner facing surface of the outer cylindrical element 66 and has a diameter that is approximately equal to the inner diameter of the spring 60 so that the inner cylindrical surface 62a of the plug 62 can be inserted into a first end 60a of the spring. An opposite end 60b of the spring 60 rests against the outer surface 44a of the piston 44.

One end 28b of the piston rod 28 is threaded and secured to a threaded opening 68 through the base 70 of a u-shaped rod clevis 72. Holes 74 and 75 through the ends of the prongs 76 and 78 of the clevis 72 have a clevis pin 80 extending therethrough. A cross hole 82 receives a split pin 84 to secure the clevis pin in place. The tang 16b of a cable 16, as shown in FIG. 1, is held in place by the clevis pin 80.

The second end cap 24 has a u-shaped rod clevis 90 secured thereto. Holes 92 through the ends of the prongs 94 and 96 of the clevis 90 have a clevis pin 98 extending therethrough. A cross hole in the clevis pin 98 receives a split pin to secure the clevis pin 98 in place. The tang 104 can be mounted to a member 13a of the oil well member 13 and held in place by the pin 98.

The hydraulic cylinder 26 has piston member 44 normally biased by spring 60 toward the one end of the internal volume of cylinder 26. The piston 44 follows the piston rod 57 due to the pushing force of the spring 60. The coil-shaped spring 61 is installed in such a state that it is compressed between the piston rod 49 and the compression end 22a of cylinder 26.

Figure 5:
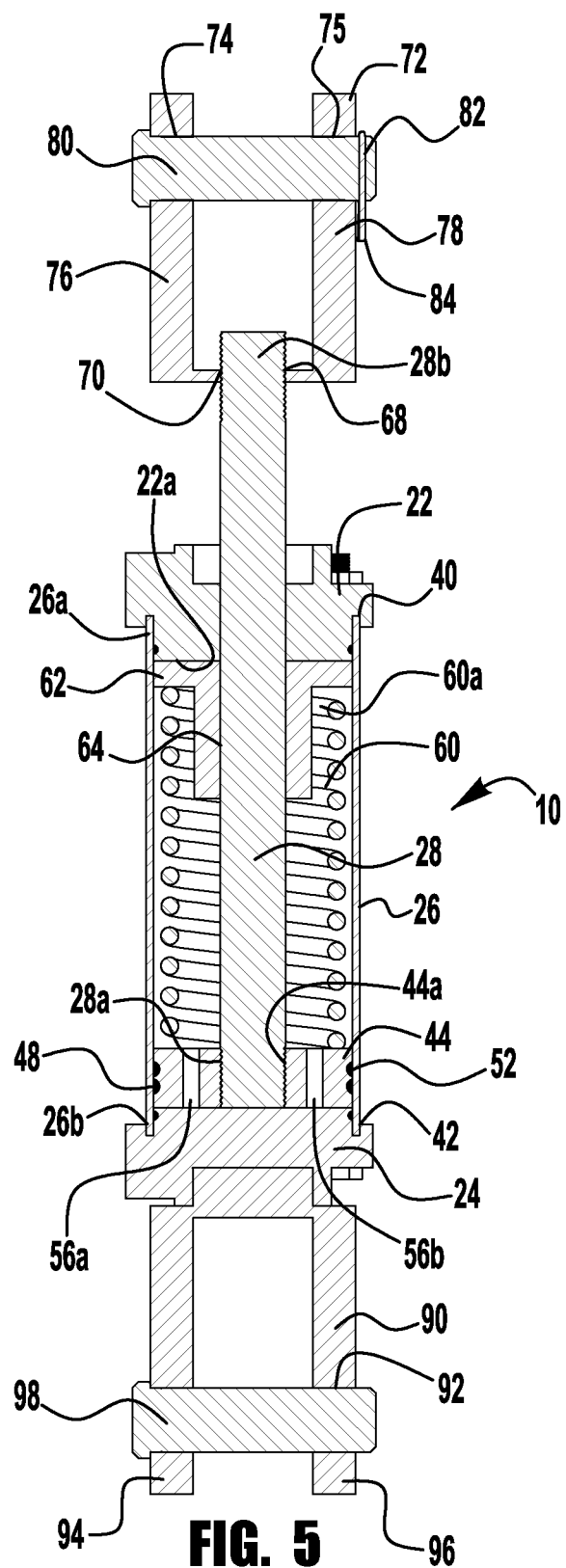

The torque impact mitigator 10 has a hydraulic fluid charged into the hydraulic cylinder 26. The spring 60 is installed to normally bias the piston 44 against the second end cap 24 and aid in impact mitigation, as shown in FIG. 5. The piston 44 is retained on the end of piston rod 28 by a threaded connection. The piston 44 generally subdivides the internal volume of hydraulic cylinder 26 into a compression volume located between piston 44 and the compression end 26a of cylinder 26, and a rebound volume located between piston 44 and the rebound end 22b of the cylinder 26.

Figure 6:
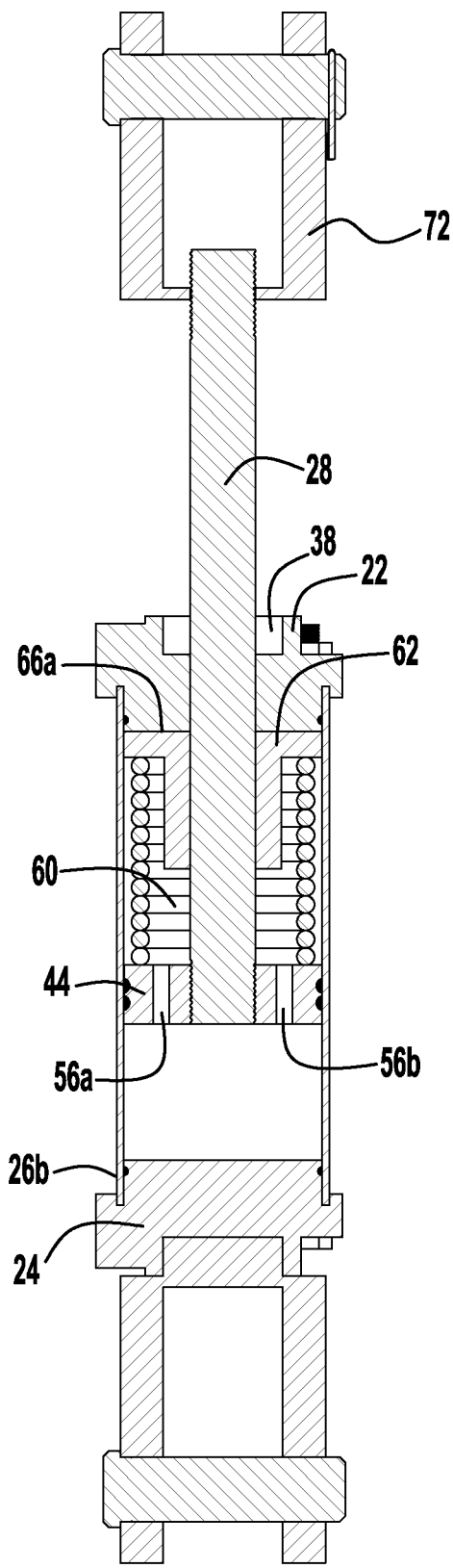
Figure 6A:
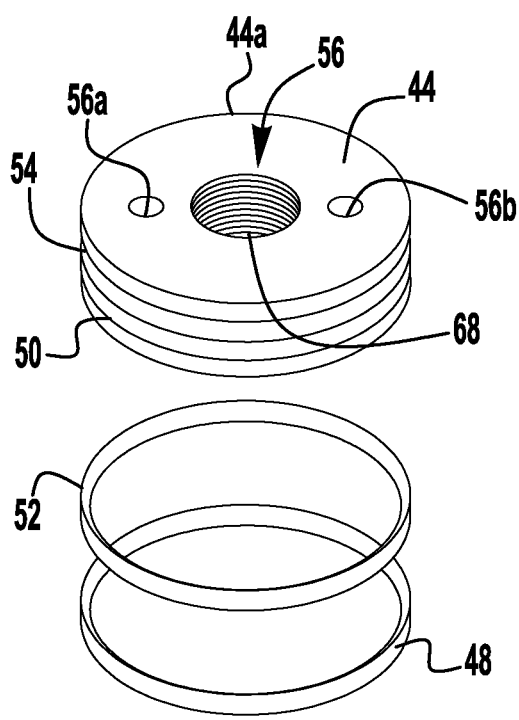

The movement of the piston 44 toward the compression end 26a of cylinder 26, as shown in FIG. 6, results in a reduction in the size of compression volume in the compression end of the cylinder, and the subsequent flow of hydraulic fluid through bores 56a and 56b of the piston 44. The movement of the piston 44 toward the compression end 26a simultaneously enlarges the rebound volume in the cylinder 26 between the piston 44 and the rebound end 26b. As piston 44 moves towards the compression end 26a of cylinder 26, the spring 60 compresses and slows the movement of the piston 44 which in turn slows the movement of the rod clevis 72 out of the cylinder. The effect is to mitigate the movement of the device 12, such as a power tong as shown in FIG. 1, secured to the rod clevis 72 causing the piston 44 to pull out of the cylinder 26.

The spring 60 normally biases the piston member 44 towards the rebound end 26b of the internal volume of cylinder 26, as shown in FIG. 5. As the u-shaped rod clevis 72 is moved away from the compression end 26a of the hydraulic cylinder 26, the spring contracts and develops increases a greater and greater force on the piston member 44 towards the rebound end 22b of the cylinder 26. The plug 62 limits the compression of the spring 60 and ensures that the spring does not buckle as the spring is compressed.

Once the force pulling the u-shaped rod clevis 72 away from the compression end 22a of cylinder 26 is removed, the spring 60 forces the piston 44 towards the rebound end 22b of the internal volume of cylinder 26 and back to an unloaded location at the bottom end 26b of the cylinder 26. As mentioned before, the movement of the piston 44 back to its initial location will be slowed by the flow of hydraulic fluid in the rebound volume through bores 56a and 56b of the piston 44 and into the compression volume in the compression end of the cylinder 26. The flow of hydraulic fluid through bores 56a and 56b of the piston 44 results in the increase of the volume of hydraulic fluid in the compression volume in the compression end while simultaneously decreasing the volume of hydraulic fluid in the rebound volume in the rebound end of the cylinder.

The effect of this change in the compression volume of hydraulic fluid in the compression end and while simultaneously decreasing the rebound volume of hydraulic fluid in the rebound end of the cylinder 26 is to mitigate or slow down the movement of the device, such as a power tong, to prevent damage to the tubular being joined together.

The spring 60 biases the piston member 44 towards the rebound end 22b of the internal volume of cylinder 26. As the u-shaped rod clevis 72 is moved away from the compression end 22a of cylinder 26 of the hydraulic cylinder 26, the spring contracts and increases a greater and greater force on the piston member towards the rebound end 22b of the cylinder 26. The plug 62 limits the compression of the spring 62 and ensures that the spring does not buckle as the spring is compressed. Once the force pulling the u-shaped rod clevis 72 away from the compression end 22a of cylinder 26 is removed, the spring forces the piston 44 towards the rebound end 22b of the internal volume of cylinder 26.

The bores 56a and 56b through piston 44 allows the hydraulic fluid to move between the compression volume located between piston 44 and the compression end 26a of cylinder 26, and the rebound volume located between piston and the rebound end 22b of the cylinder 26. The size of the bores 56a and 56b in conjunction with the viscosity of the selected hydraulic fluid controls the speed of the piston as it moves in the cylinder. The effect of controlling the speed that the piston is to mitigate the movement of the device, i.e. the power tongs, attached to the compression end of the hydraulic cylinder 26.

Figure 7:
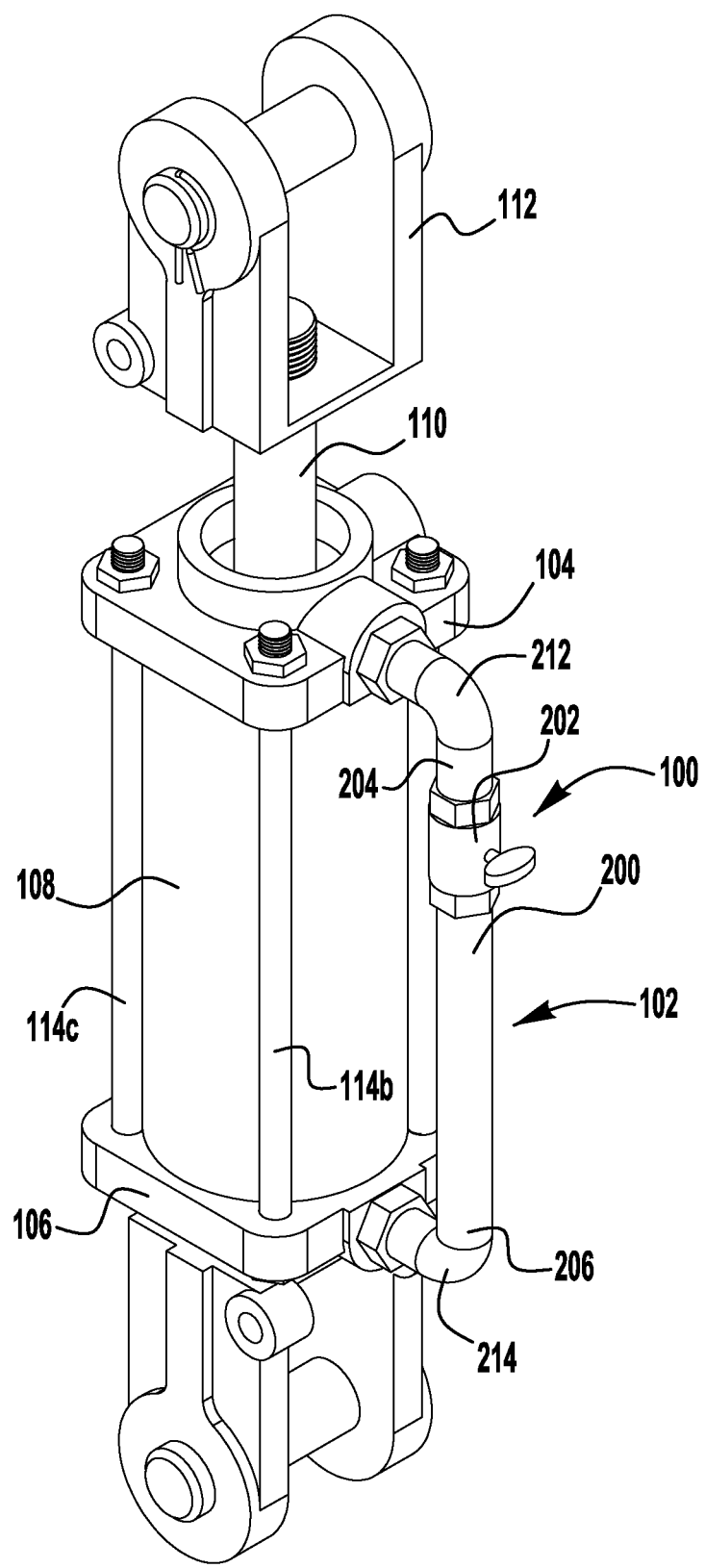

FIG. 7 is a front, three-dimensional view of a torque impact mitigator 100 which is an alternative embodiment to the torque impact mitigator 10 shown in FIG. 2. The torque impact mitigator 100 includes a housing assembly 102, comprising a first end cap 104, a second end cap 106, and a tube or hydraulic cylinder 108 that is secured between the first end cap 104 and second end cap 106. A piston rod 110 extends out from the first end cap 104 and is threaded to a rod clevis 112. The first and second end caps 104 and 106 are secured to opposite ends of the tube or hydraulic cylinder 108, or any applicable cylinder, by four tie rods 114a, 114b, 114c, and 114d (compare tie rods 32a-32d in FIG. 3) to form housing assembly 102.

Figure 8:
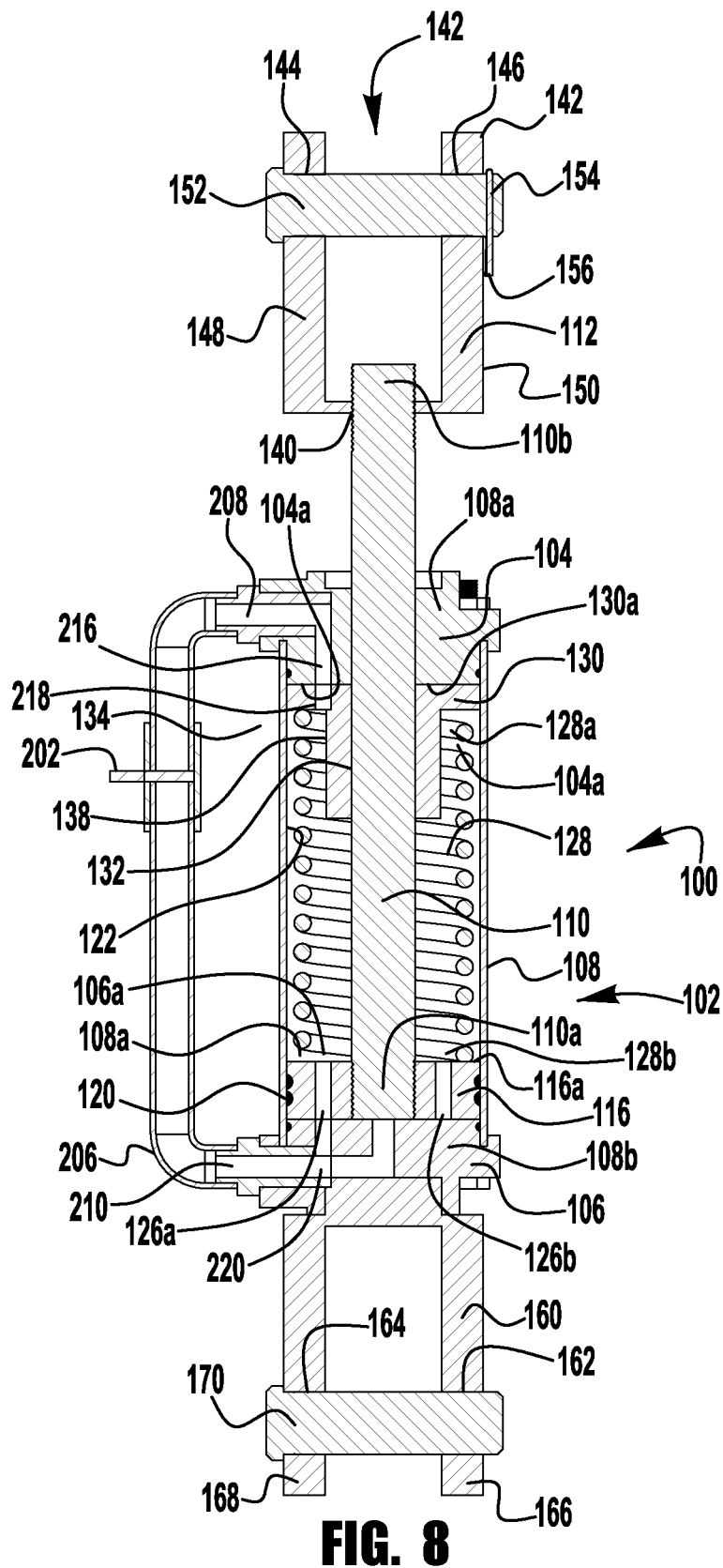

The torque impact mitigator 100 contains a piston 116 disposed within the hydraulic cylinder 108 so as to reciprocate back and in the cylinder. The piston 116 has one end 110a of the piston rod 110 secured thereto, typically by a threaded connection, within a threaded opening within the piston 116. As shown in FIG. 8, a piston wear ring 120 is fitted into a first groove formed in the cylindrical surface 116a of the piston 116. The piston wear ring 120 provides a side load bearing area to prevent scoring of the inner surface 122 of the hydraulic cylinder 108. A piston seal 124 is fitted into a second groove formed in the cylindrical outer surface 116a of the piston 116. The piston seal 124 can be for example, an o-ring expander which provides a positive seal with minimal friction to extend the seal operation under high pressure.

The piston 116 can have a one or more bores 126a and 126b extending therethrough. While two bores 126a and 126b are illustrated, it is within the scope of the invention to use as few as one bore and as many as needed, such as for example six or eight bores.

Referring again to FIG. 8, a compression spring 128 is disposed about the piston rod 110 and has an outer diameter approximately equal to the inner diameter of the hydraulic cylinder 108. A plug 130 is disposed within the upper end 128a of the spring 128. The plug 130 has a bore 132 extending therethrough to receive piston rod 110. The plug 130 has an outer cylindrical element 134 which has a diameter that is approximately equal to the inner diameter of the hydraulic cylinder 108. The outer surface 130a of the plug 130 rests against the inner surface 104a of the first end cap 104. The plug 130 has an inner cylindrical surface element 138 which intersects the inner facing surface of the outer cylindrical element 134 and has a diameter that is approximately equal to the inner diameter of the spring 128 so that the inner cylindrical surface 138 of the plug 130 can be inserted into a first end 128a of the spring 128. An opposite end 128b of the spring 128 rests against the outer surface 116a of the piston 116.

One end 110b of the piston rod 110 is threaded and secured to a threaded opening through the base 140 of a u-shaped rod clevis 142. Holes 144 and 146 through the ends of the prongs 148 and 150 of the clevis 142 have a clevis pin 152 extending therethrough. A cross hole 154 receives a split pin 156 to secure the clevis pin in place. The tang of a cable (not shown), compare tang 16b of cable 16, as shown in FIG. 1, is held in place by the clevis pin 152.

The second end cap 158 has a u-shaped rod clevis 160 secured thereto. Holes 162 and 164 through the ends of the prongs 166 and 168, respectively, of the clevis 160 have a clevis pin 170 extending therethrough. A cross hole (not shown) in the clevis pin 170 receives a split pin (not shown) to secure the clevis pin 170 in place.

The hydraulic cylinder 108 has piston member 116 normally biased by spring 128 towards the one end of the internal volume of hydraulic cylinder 108. The piston member 116 follows the piston rod 110 due to the pushing force of the spring 128. The coil-shaped spring 128 is installed in such a state that it is compressed between the piston rod 110 and the compression end 108a of hydraulic cylinder 108.

The torque impact mitigator 100 has a hydraulic fluid charged into the hydraulic cylinder 108. The spring 128 is installed to normally bias the piston 116 against the second end cap 106 and aid in impact mitigation, as shown in FIG. 8. The piston 116 is retained on the end of piston rod 110 by a threaded connection. The piston 116 generally subdivides the internal volume of hydraulic cylinder 108 into a compression volume 104a located between piston 116 and the compression end 108a and a rebound volume 106a located between piston 116 and the rebound end 108b. While the hydraulic cylinder 108 is illustrated as a tube, it must be noted that any size, shape or configuration of hydraulic cylinder may be used, depending on the application.

Figure 9:
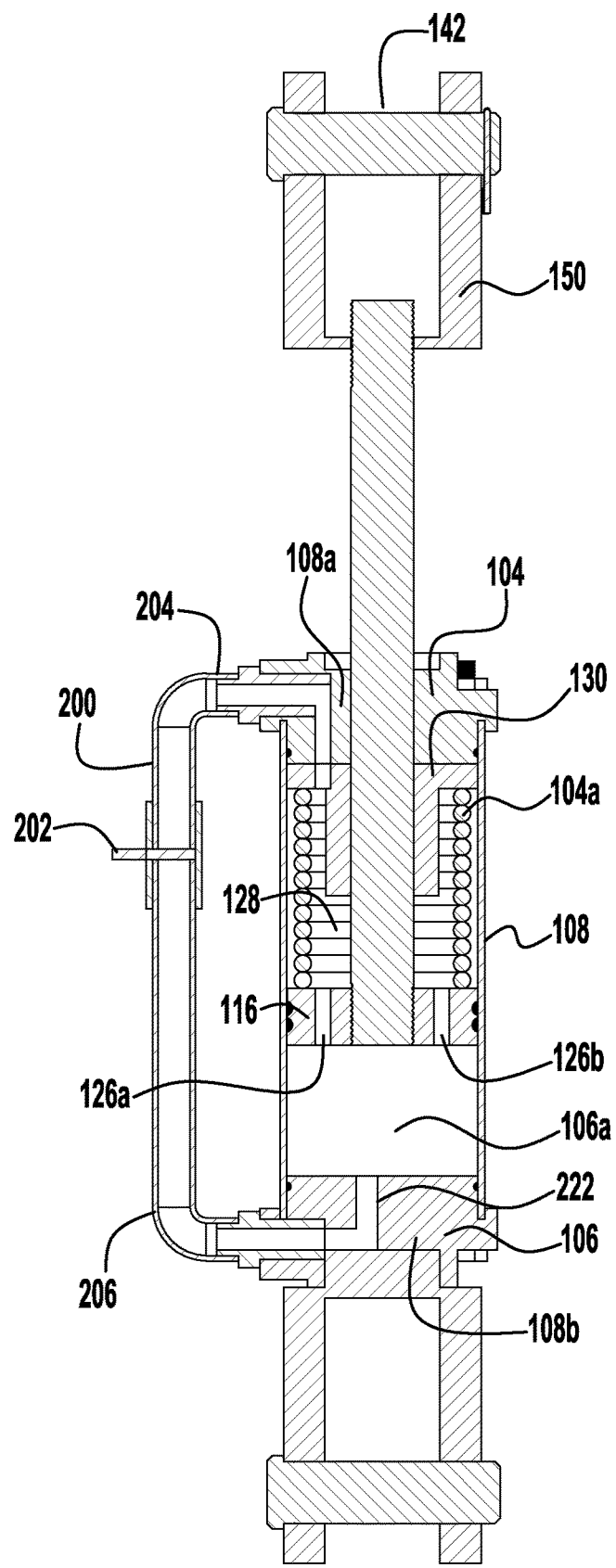

The movement of the piston 116 toward the compression end 108a, as shown in FIG. 9, results in a reduction in the size of compression volume 104a of the hydraulic cylinder 108, and the subsequent flow of hydraulic fluid through bores 126a and 126b of the piston 116 from compression volume 104a of the hydraulic cylinder 108 to the rebound volume 106a. The movement of the piston 116 toward the compression end 108a simultaneously enlarges the rebound volume 106a in the hydraulic cylinder 108 between the piston 116 and the rebound end 108b. As piston 116 moves towards the compression end 108a of hydraulic cylinder 108, the spring 128 compresses and slows the movement of the piston 116 which in turn slows the movement of the rod clevis 142 out of the hydraulic cylinder 108. The effect is to mitigate the movement of the device 100, such as a power tong as shown in FIG. 1, secured to the rod clevis 142 causing the piston 116 to pull out of the hydraulic cylinder 108.

The spring 128 normally biases the piston member 116 towards the rebound end 108b of the internal volume of hydraulic cylinder 108, as shown in FIG. 9. As the u-shaped rod clevis 142 is moved away from the compression end 108a of the hydraulic cylinder 108, the spring contracts and develops a greater and greater force on the piston member 116 towards the rebound end 108b of the hydraulic cylinder 108. The plug 130 limits the compression of the spring 128 and ensures that the spring does not buckle as the spring is compressed.

Once the force pulling the u-shaped rod clevis 142 away from the compression end 108a of hydraulic cylinder 108 is removed, the spring 128 forces the piston 116 towards the rebound end 108b of the internal volume of hydraulic cylinder 108 and back to an unloaded location at the rebound end 108*b* of the cylinder. As mentioned before, the movement of the piston 116 back to its initial location will be slowed by the flow of hydraulic fluid in the rebound volume 106*a* through bores 126*a* and 126*b* of the piston and into the compression volume 104*a* in the compression end 108*a* of the hydraulic cylinder 108. The flow of hydraulic fluid through bores 126*a* and 126*b* of the piston 116 results in the increase of the volume of hydraulic fluid in the compression volume 104*a* in the compression end 108*a* while simultaneously decreasing the volume of hydraulic fluid in the rebound volume 106*a* in the rebound end 108*b* of the hydraulic cylinder 108.

The effect of this change in the compression volume 104*a* of hydraulic fluid in the compression end 108*a* and while simultaneously decreasing the rebound volume 106*a* of hydraulic fluid in the rebound end 108*b* of the hydraulic cylinder 108 is to mitigate or slow down the movement of the device, such as a power tong, to prevent damage to the tubulars being joined together.

The spring 108 biases the piston member 116 towards the rebound end 108*b* of the internal volume of hydraulic cylinder 108. As the u-shaped rod clevis 142 is moved away from the compression end 108*a* of the hydraulic cylinder 108, the spring contracts and increases with a greater and greater force on the piston member 110 towards the rebound end 108*b* of the hydraulic cylinder 108. The plug 130 limits the compression of the spring 128 and ensures that the spring does not buckle as the spring is compressed. Once the force pulling the u-shaped rod clevis 142 away from the compression end 108*a* of hydraulic cylinder 108 is removed, the spring forces the piston 116 towards the rebound end 108*b* of the internal volume of hydraulic cylinder 108.

The bores 126*a* and 126*b* through piston 116 allows the hydraulic fluid to move between the compression volume 104*a* located between piston 116 and the compression end 108*a* of hydraulic cylinder 108, and the rebound volume 106*a* located between piston and the rebound end 108*b* of the hydraulic cylinder 108. The size of the bores 126*a* and 126*b* in conjunction with the viscosity of the selected hydraulic fluid controls the speed of the piston 116 as it moves in the hydraulic cylinder 108. The effect of controlling the speed of the piston 116 is to mitigate the movement of the device, i.e. the power tongs, attached to the compression end 108*a* of the hydraulic cylinder 108.

As illustrated in FIG. 7, a damper tube 200 is provided to further control the speed of the piston 116 as it moves through the hydraulic cylinder 108, and thereby enhance the mitigation of the movement of the device i.e. the power tongs or other devices, attached to the compression end 108*a* of the hydraulic cylinder 108. The damper tube 200 connects the compression end 108*a* and the rebound end 108*b* of the hydraulic cylinder 108. Hydraulic fluid that moves between the compression volume 104*a* located between piston 116 and the compression end 108*a*, and the rebound volume 106*a* located between piston and the rebound end 108*b* flows through the damper tube 200 and can be further modulated by an adjustable flow control valve 202. The adjustable flow control valve 202 is located in the damper tube 200 and can be opened and closed to control the flow speed of the hydraulic fluid through the damper tube. The adjustable flow control valve 202 provides additional control of the flow speed of the hydraulic fluid through the damper tube to optimizing system performance, by relying on a flow passage or port within the control valve 202 having a variable flow area. Various types of control valves 202 may be utilized, such as for example but not limited to gate valves, globe valves, plug valves, and ball valves.

As seen in FIGS. 8 and 9, the damper tube 200 includes an upper end 204 and a lower end 206, which are connected to the hydraulic cylinder 108 through first and second ports 208 and 210, respectively. Further, as shown in FIG. 8, the upper end 204 and a lower end 206 are connected to the first and second ports 208 and 210, respectively, though elbow-shaped joints 212 and 214, respectively.

The upper port 208 is connected by a passageway 216 to the hydraulic cylinder 208 through a plug port 218, which extends through the outer cylindrical element 134 of the plug 130, and the end cap. Therefore, damper tube 200 is in fluid communication with the compression volume 104*a*, so that hydraulic fluid can flow into and out of the damper tube 200 as the piston 116 reciprocates within the hydraulic cylinder.

The lower port 210 is connected by a passageway 220 to the rebound end 108*b* of the hydraulic cylinder 208 through a port 222, which extends through the end cap 106. Therefore, damper tube 200 is in fluid communication with the rebound volume 106*a*, so that hydraulic fluid can flow into and out of the damper tube 200 as the piston 116 reciprocates within the hydraulic cylinder.

As illustrated in FIG. 10, an additional embodiment of a torque mitigator 301 is provided wherein a relief valve 300 is provided to further control the speed of a piston 302 as it moves through the hydraulic cylinder 308, and thereby enhance the mitigation of the movement of the device, i.e. the power tongs or other devices, attached to the compression end 308*a* of the hydraulic cylinder 308.

A coiled compression spring 310 is disposed about the piston rod 312 and has an outer diameter approximately equal to the inner diameter of the hydraulic cylinder 308. A plug 314 is disposed within the upper end 310*a* of the spring 310. The plug 314, as shown in FIG. 10, has a bore 316 extending therethrough to receive piston rod 312. The plug 314 has an outer cylindrically shaped element 318 which has a diameter that is approximately equal to the inner diameter of the hydraulic cylinder 308. The outer facing surface 314*a* of the plug 314 rests against the inner surface 320*a* of the first end cap 320.

The plug 314 has an inner cylindrical surface element 314*b* which intersects the inner facing surface of the outer cylindrical element 318 and has a diameter that is approximately equal to the inner diameter of the spring 310 so that the inner cylindrical surface 314*b* of the plug 314 can be inserted into a first end 310*a* of the spring. An opposite end 310*b* of the spring 310 rests against the upper outer surface 302*a* of the piston 302. A cylindrical collar 302*c* projects outward from the lower outer surface of the piston 302 and has an inner threaded bore into which an end 312*a* of the threaded piston rod 312 can extend. An opposite end 312*b* of the piston rod 312 extends through a bore 321 and is slidably received through the first end cap 320.

A second end cap 342 can be threadedly mounted into the lower end 308*b* of the hydraulic cylinder 308 and seals the lower end 308*b* so that hydraulic fluid is contained within the hydraulic cylinder 308. The hydraulic cylinder 308 has a piston member 302 normally biased by spring 310 toward the second end cap 342 disposed at one end of the cylinder 308. The piston member 302 is disposed within the hydraulic cylinder 308 so as to reciprocate back and forth in the cylinder in response to the piston 312 being moved in and out of the end cap 320. The piston member 302 has one end 312*a* of the piston rod 312 secured thereto, typically by a threaded connection, within a threaded opening 302*b* within the piston 302.

As shown in FIG. 11, a piston wear ring 380 is fitted into a first groove 382 formed in the outer cylindrical surface 302d of the piston 302. The piston wear ring 380 provides a side load bearing area to prevent scoring of the inner surface 309 of the hydraulic cylinder 308. A piston seal can be fitted into a second groove (not shown) formed in the cylindrical outer surface 302d of the piston 302. The piston seal can, be for example, an o-ring expander which provides a positive seal with minimal friction to ensure the seal operation under high pressure.

As shown in FIGS. 13A and 13B, the piston 302 can have a one or more bores 384a and 384b extending therethrough. While a plurality of bores 384a and 384b are illustrated, it is within the scope of the invention to use as few as one bore and as many as needed, such as for example six or eight bores. Piston 302 has a threaded through bore 302b into which the threaded end 312a of the piston rod 312 can be secured. The piston 302 includes a threaded through bore 386 which can be secured to one end 388a of a hollow cylinder 388. The opposite end 388b of the hollow cylinder 388 is secured in the return passageway 376 within the body 360 of the relief valve 300.

The piston 302 remains in contact with the piston rod 312 due to the bias force of the compression spring 310. The coil-shaped compression spring 310 is installed in such a state that it is compressed between the piston 302 and the plug 314 disposed in the compression end 308a of cylinder 308.

Referring to FIGS. 11 and 12, the torque impact mitigator 301 includes a relief valve 300 disposed against a side 302a of the piston 302. The relief valve 300 is disposed in a housing 360 having a bore 362 closed at one end 362a with a threaded adjustment nut 364. The opposite end 362b of the bore 362 opens to an outlet bore 366 which forms a valve seat 368 at the intersection of bore 362 has an outlet bore 366. A ball valve 370 is disposed in the bore 362 and biased by a coil spring 372 against the valve seat 368. The coil spring 372 is seated against a flat, end surface 364a of the adjustment nut 364. A hollow cylinder 373 extends outward from the lower end of the rebound volume 392 and enables the adjustment of the threaded adjustment nut 364 so that the amount of force needed to open the ball valve 70 can be adjusted.

A bore 374 in the housing 360 opens at one end to the outlet bore 366 and at an opposite end to a return passageway 376 forming an inlet from the hydraulic cylinder 308 through the sidewall 360a of the housing 360. The housing 360 includes four projections 378 (only two can seen) extending outward from the sidewall 360a of the relief valve housing 360. The projections 378 are provided to mount the relief valve 300 to the piston 302 and include threaded bores 303 into which bolts projecting from through holes 301 through the piston can be attached.

The torque impact mitigator 301 has a hydraulic fluid charged into the hydraulic cylinder 308. The compression spring 310 is installed to normally bias the piston 302 and relief valve 300 against the second end cap 342 and aid in impact mitigation, as discussed herein after. The piston 302 is retained on the end of piston rod 312 by a threaded connection. The piston 302 and the connected relief valve 300 generally subdivide the internal volume of hydraulic cylinder 308 into a compression volume located between piston 302 and the compression end 308a of cylinder 308, and a rebound volume located between piston 302 and the rebound end 308b of the hydraulic cylinder 308.

The movement of the piston 302 towards the compression end 308a of cylinder 308, as shown in FIG. 14, results in a reduction in the size of compression volume in the compression end of the cylinder, and the flow of hydraulic fluid from the compression end through bores 384a and 384b of the piston 302. The movement of the piston 302 toward the compression end 308a simultaneously enlarges the rebound volume in the cylinder 308 between the piston 302 and the rebound end 308b. As piston 302 moves towards the compression end 308a of cylinder 308, the compression spring 310 compresses and slows the movement of the piston 302 which in turn slows the movement of the piston rod 312 out from the cylinder 308. The effect is to mitigate the movement of the device 12, such as a power tong as shown in FIG. 1, secured to the opening 312c at the end of the piston rod 312 causing the piston 302 to move more slowly towards the end cap 320.

The compression spring 310 normally biases the piston member 302 towards the rebound end 308b of the internal volume of cylinder 308, as shown in FIG. 10. As the end of the piston rod 312 is moved towards the end cap 320, the compression spring 310 contracts and develops a greater and greater force against the piston member 302 towards the rebound end 308b of the cylinder 308. The plug 314 limits the compression of the spring 310 and ensures that the spring does not buckle as the spring is compressed.

Referring to FIG. 10, there is shown a piston 302 disposed against and secured to relief valve 300. The relief valve 300 is secured to the piston member 302 by means such as bolts through holes 301 extending through the piston member and into threaded holes 303 in the four projections 378. The combination of the piston member 302 and the relief valve 300 are normally biased by compression spring 310 towards the rebound end 308b of the internal volume of hydraulic cylinder 308. The combination of the piston member 302 and the relief valve 300 are mounted to the piston rod 310 which itself is secured to the piston due to the threaded through bore 302b into which the threaded end 312a of the piston rod 312 can be secured. The coil-shaped spring 310 is installed in such a state that it is not initially compressed between the piston member 302 and the compression end 308a of hydraulic cylinder 308.

The torque impact mitigator 301 has a hydraulic fluid charged into the hydraulic cylinder 308. The piston 302 generally subdivides the internal volume of hydraulic cylinder 308 into a compression volume 390, as shown in FIG. 14, located between piston 302 and the compression end 308a and a rebound volume 392 located between piston 302 and the rebound end 308b. While the hydraulic cylinder 308 is illustrated as a tube, it must be noted that any size, shape or configuration of hydraulic cylinder may be used, depending on the application.

The movement of the combination of the piston member 302 and the relief valve 300 towards the compression end 308a, as shown in FIG. 14, results in a reduction in the size of compression volume 390 of the hydraulic cylinder 308, and the subsequent flow of hydraulic fluid through bores 384a and 384b of the piston 302 from compression volume 390 of the hydraulic cylinder 108 and into the rebound volume 392. The movement of the piston 302 toward the compression end 308a simultaneously enlarges the rebound volume 392 in the hydraulic cylinder 308 between the piston relief valve 300 and the rebound end 308b. As piston 302 moves towards the compression end 308a of hydraulic cylinder 308, the spring 310 compresses and slows the movement of the piston 302 which in turn slows the movement of the clevis 326 out of the hydraulic cylinder 308. The effect is to mitigate the movement of the device 100, such as a power tong as shown in FIG. 1, secured to the opening 312c at the end of the piston rod 312 causing the piston 302 to move more slowly towards the end cap 320. The plug 314 limits the compression of the spring 310 and ensures that the spring does not buckle as the spring is compressed.

Once the force pulling the opening 312c at the end of the piston rod 312 away from the compression end 308a of hydraulic cylinder 308 is removed, the spring 310 forces the piston 302 towards the rebound end 308b of the internal volume of hydraulic cylinder 308 and back to an unloaded location at the rebound end 308b of the cylinder, as shown in FIG. 10. As mentioned herein before, the movement of the piston 302 back to its initial, unloaded location will be slowed by the flow of hydraulic fluid in the rebound volume 392 through bores 384a and 384b of the piston and into the compression volume 390 in the compression end 308a of the hydraulic cylinder 308. The flow of hydraulic fluid through bores 384a and 384b of the piston 302 results in the increase of the volume of hydraulic fluid in the compression volume 390 in the compression end 308a while simultaneously decreasing the volume of hydraulic fluid in the rebound volume 392 in the rebound end 308b of the hydraulic cylinder 308.

The effect of this change in the compression volume 390 of hydraulic fluid in the compression end 308a and while simultaneously decreasing the rebound volume 392 of hydraulic fluid in the rebound end 308b of the hydraulic cylinder 308 is to mitigate or slow down the movement of the device, such as a power tong, to prevent damage to the tubulars being joined together.

The spring 310 biases the piston member 302 towards the rebound end 308b of the internal volume of hydraulic cylinder 308. As force pulling the opening 312c at the end of the piston rod 312 moves the piston rod 312 towards the compression end 308a of the hydraulic cylinder 308, the spring 310 contracts and increases with a greater and greater force on the piston member 302 towards the rebound end 308b of the hydraulic cylinder 308. The plug 314 limits the compression of the spring 310 and ensures that the spring does not buckle as the spring is compressed. Once the force pulling the force pulling the opening 312c at the end of the piston rod 312 away from the compression end 308a of hydraulic cylinder 308 is removed, the spring biases the piston 302 towards the rebound end 308b of the internal volume of hydraulic cylinder 308.

The bores 384a and 384b through piston 302 allows the hydraulic fluid to move between the compression volume 390 located between piston 302 and the compression end 308a of hydraulic cylinder 308, and the rebound volume 392 located between piston 302 and the rebound end 308b of the hydraulic cylinder 308. The size and number of the bores 384a and 384b in conjunction with the viscosity of the selected hydraulic fluid controls the speed of the piston 302 as it moves in the hydraulic cylinder 308. The effect of controlling the speed of the piston 302 is to mitigate the movement of the device, i.e. the power tongs, attached to the compression end 308a of the hydraulic cylinder 308.

As illustrated in FIGS. 11 and 12, a relief valve 302 is provided to mitigate an initial pressure surge created by a rapid pull on the clevis 326, by a device such as the power tongs shown in FIG. 1, when the piston and relief valve are in the unloaded state as shown in FIG. 10. The initial surge is very strong and would without the provision of the relief valve 302 create a strong shock to the torque mitigator 301 which can result in the destruction of the mitigator and a possible dangerous situation because the that the power tongs could be out of control and injure the workers operating the power tongs.

In operation, the piston rod 312 is initially pulled out of bore 321 extending through the first end cap 320. There is a pressure surge caused by the initial movement, such as that created by the rotation of the power tongs. The upward movement of the piston 302 and the attached relief valve 300 causes an instantaneous hydraulic pressure increase through the piston passageway 386 of the piston 302, a first bore 374 in the housing 360 of the relief valve which opens at one end to the outlet passageway 366. The pressure spike forces the ball valve 370 off the valve seat 368 so that the high-pressure hydraulic fluid enters a spring bore 362. The high pressure fluid in spring bore 362 is directed through an outlet bore 371 which extends through the housing 360 and opens to the interior of the hydraulic cylinder 308. As soon as the ball valve 370 moves off the valve seat 368, the pressure in the outlet passageway decreases and the ball valve reseats on the valve seat. The decrease in pressure passageway 366 occurs so quickly that it is almost hard to see. However, the effect of eliminating the otherwise deleterious effect of the pressure surge has been found to prevent the destruction of the mitigator and the possible breakage of the power tongs.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A torque impact mitigator, comprising:
a housing assembly including a hydraulic cylinder having a compression end and a rebound end;
a piston disposed within the hydraulic cylinder;
a piston rod mounted at a first end to the piston and having a second end extending out from the hydraulic cylinder;
a compression spring disposed against the piston to be compressed into a compressed state when the piston rod is moved out of the hydraulic cylinder and to be released into a relaxed state when the piston rod is moved into the hydraulic cylinder;
one or more bores disposed through the piston to allow the passage of hydraulic fluid from the rebound end into the compression end when the piston is moved from the compression end to the rebound end, and to allow the passage of hydraulic fluid from the compression end into the rebound end when the piston is moved from the rebound end to the compression;
a relief valve secured to the piston within the rebound end of the hydraulic cylinder to momentarily open in response to an instantaneous pressure increase of the hydraulic pressure generated by the initial movement of the piston from the rebound end to the compression end of the hydraulic cylinder; and
wherein a first end of the torque impact mitigator is configured to be connected to a first end of a cable, whereby a second end of the cable is configured to be connected to a power tong; and
wherein a second end of the torque impact mitigator is configured to be mounted to a support on an oil drilling rig.

2. The torque impact mitigator of claim 1 wherein the instantaneous pressure increase causes hydraulic fluid to flow through a passageway through the piston and into a first bore into the relief valve which opens to an outlet passageway closed at a first end by a ball valve biased by a spring disposed in a second bore so that the hydraulic fluid flows into the outlet passageway.

3. The torque impact mitigator of claim 2 wherein a valve seat formed between a first end of the second bore of the relief valve and the outlet passageway is closed by the ball valve.

4. The torque impact mitigator of claim 3 wherein the housing assembly includes:
a first end cap secured to the compression end of the hydraulic cylinder; and
a second end cap mounted to the rebound end of the hydraulic cylinder.

5. The torque impact mitigator of claim 3 further including an adjustment nut threaded into a second end of the second bore to adjust the bias of the spring against the ball valve.

6. The torque impact mitigator of claim 5 wherein the spring disposed in the second bore is a compression spring.

7. The torque impact mitigator of claim 3 further including an outlet bore which opens to an interior of the hydraulic cylinder, the outlet bore connected to the second bore to direct hydraulic fluid which enters the second bore when the ball valve is open into the interior of the hydraulic cylinder.

8. The torque impact mitigator of claim 7 further including the relief valve being secured to the piston.

9. The torque impact mitigator of claim 4 further including a hollow cylinder connected at one end to a piston passageway through the piston and at an opposite end to the first bore within the relief valve.

10. The torque impact mitigator of claim 4 further including a plug disposed within an upper end of the compression spring and having a bore extending therethrough to receive the piston rod.

11. The torque impact mitigator of claim 10 wherein an outer surface of the plug rests against an inner surface of the first end cap.

12. The torque impact mitigator of claim 11 wherein the plug has an inner cylindrical surface element which intersects an inner facing surface of an outer cylindrical element and has a diameter that is approximately equal to an inner diameter of the compression spring so that the inner cylindrical surface element of the plug can be inserted into the upper end of the spring.

13. The torque impact mitigator of claim 10 wherein the compression spring is disposed about the piston rod and against the piston and against the plug.

14. The torque impact mitigator of claim 13 wherein:
the relief valve being secured to the piston has four projections extending outward from a sidewall of the relief valve to space the relief valve from the piston member; and
the relief valve is bolted to the piston member with bolts extending through the four projections.

15. A torque impact mitigator, comprising:
a housing assembly including a hydraulic cylinder having a compression end and a rebound end;
the housing assembly including a first end cap secured to the compression end of the hydraulic cylinder and a second end cap mounted to the rebound end of the hydraulic cylinder;
a piston disposed within the hydraulic cylinder and adapted to reciprocate back and forth within the hydraulic cylinder;
a piston rod disposed within the hydraulic cylinder and mounted at a first end to the piston and having a second end extending out from the hydraulic cylinder through a bore through the first end cap;
a compression spring disposed between the piston and the first end cap to compress the compression spring into a compressed state when the piston rod is moved out of the hydraulic cylinder through the bore and to release the compression spring into a relaxed state when the piston rod is moved towards the second end cap;
one or more bores disposed through the piston to allow the passage of hydraulic fluid from the rebound end into the compression end of the hydraulic cylinder when the compression spring is released into the relaxed state when the piston is moved from the compression end of the hydraulic cylinder to the rebound end, and to allow the passage of hydraulic fluid from the compression end into the rebound end of the hydraulic cylinder when the compression spring moves from the relaxed state to the compressed state;
a relief valve secured to the piston within the rebound end of the hydraulic cylinder to momentarily reduce the pressure of the hydraulic fluid caused by an instantaneous hydraulic pressure increase due to the initial movement of the piston from the rebound end to the compression end of the hydraulic cylinder; and
wherein a first end of the torque impact mitigator is configured to be connected to a first end of a cable, whereby a second end of the cable is configured to be connected to a power tong; and
wherein a second end of the torque impact mitigator is configured to be mounted to a support on an oil drilling rig.

16. The torque impact mitigator of claim 15 wherein the instantaneous pressure increase causes hydraulic fluid to flow through a passageway through the piston and into a first bore into the relief valve which opens to an outlet passageway closed at a first end by a ball valve biased by a spring disposed in a second bore so that the hydraulic fluid flows into the outlet passageway.

17. The torque impact mitigator of claim 16 wherein a valve seat formed between a first end of the second bore of the relief valve and the outlet passageway is closed by the ball valve.

18. The torque impact mitigator of claim 17 further including an adjustment nut threaded into a second end of the second bore to adjust the bias of the spring against the ball valve.

19. The torque impact mitigator of claim 18 further including an outlet bore which opens to an interior of the hydraulic cylinder, the outlet bore connected to the second bore to direct hydraulic fluid which enters the second bore when the ball valve is open into the interior of the hydraulic cylinder.

20. The torque impact mitigator of claim 19 further including the relief valve being secured to the piston.

* * * * *